United States Patent
Kowalkowski et al.

(10) Patent No.: US 9,376,952 B2
(45) Date of Patent: Jun. 28, 2016

(54) METHOD AND SYSTEM FOR SELECTIVELY ENABLING AND DISABLING A DIAGNOSTIC MONITOR OF A SELECTIVE-CATALYTIC-REDUCTION DEVICE

(71) Applicant: GM GLOBAL TECHNOLOGY OPERATIONS LLC, Detroit, MI (US)

(72) Inventors: Janean E. Kowalkowski, Northville, MI (US); Timothy J. Holbert, Clarkston, MI (US)

(73) Assignee: GM Global Technology Operations LLC, Detroit, MI (US)

(*) Notice: Subject to any disclaimer, the term of this patent is extended or adjusted under 35 U.S.C. 154(b) by 257 days.

(21) Appl. No.: 13/905,473

(22) Filed: May 30, 2013

(65) Prior Publication Data
US 2014/0352278 A1    Dec. 4, 2014

(51) Int. Cl.
| F01N 11/00 | (2006.01) |
| F01N 3/20 | (2006.01) |
| F01N 9/00 | (2006.01) |

(52) U.S. Cl.
CPC ............ *F01N 11/002* (2013.01); *F01N 3/2066* (2013.01); *F01N 9/002* (2013.01); *F01N 11/00* (2013.01); *F01N 2550/02* (2013.01); *F01N 2900/08* (2013.01); *F01N 2900/1606* (2013.01); *Y02T 10/24* (2013.01); *Y02T 10/47* (2013.01)

(58) Field of Classification Search
CPC ..... F01N 11/00; F01N 11/002; F01N 3/2066; F01N 2550/02; F01N 2900/0414; F01N 2900/0416; F01N 2900/0422; F01N 2900/102; F01N 2900/1406; F01N 2900/1606; F01N 2900/1621

See application file for complete search history.

(56) References Cited

U.S. PATENT DOCUMENTS

| 2008/0317643 A1 | 12/2008 | Sato |
| 2011/0061372 A1* | 3/2011 | Levijoki et al. ................. 60/286 |

FOREIGN PATENT DOCUMENTS

| DE | 2130436 A1 | 3/1972 |
| DE | 10022842 A1 | 11/2001 |
| DE | 102010036152 A1 | 4/2011 |

* cited by examiner

*Primary Examiner* — Kenneth Bomberg
*Assistant Examiner* — Jonathan Matthias
(74) *Attorney, Agent, or Firm* — Quinn Law Group, PLLC

(57) ABSTRACT

A vehicle that includes an engine, an exhaust system, and a controller, and a method are disclosed herein. The exhaust system includes a passage for directing the exhaust gas stream from the engine through the series of exhaust after-treatment devices, including a selective-catalytic reduction device and a diesel particulate filter (DPF). The exhaust after-treatment devices are employed to reduce various exhaust emissions of the engine. The exhaust system, may however, prematurely return failing emissions results due to the amount of contaminants that have flowed through the exhaust system since the last regeneration even of the particulate filter. Therefore, the controller may, via the present method, alter the threshold of the SCR efficiency diagnostic due to contaminants accumulated on the DPF and selectively enable or disable the diagnostic based on a set of recorded instructions, to improve the robustness of the SCR efficiency diagnostic and prevent inaccurate failing emissions results.

10 Claims, 2 Drawing Sheets

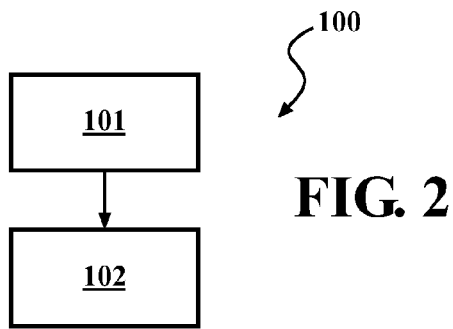
FIG. 2
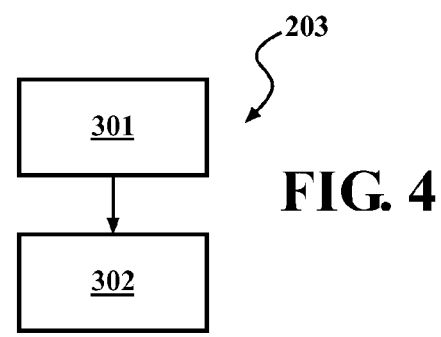
FIG. 4
FIG. 3
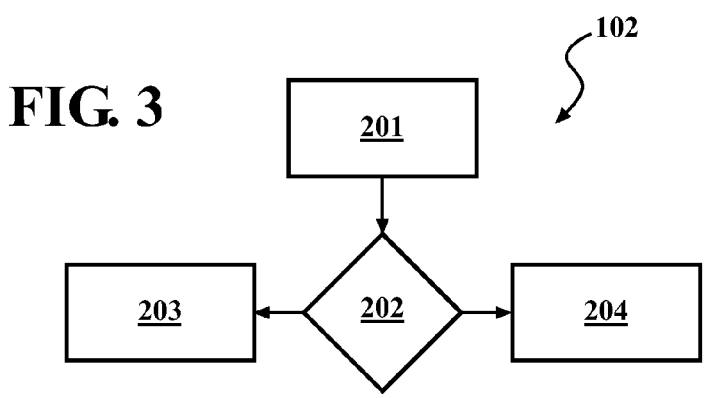
FIG. 5
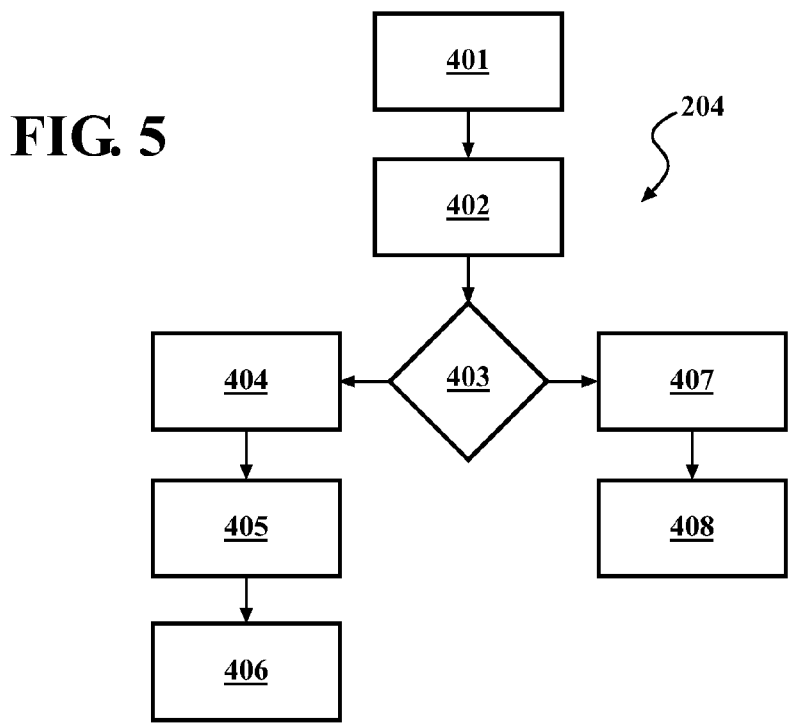

METHOD AND SYSTEM FOR SELECTIVELY ENABLING AND DISABLING A DIAGNOSTIC MONITOR OF A SELECTIVE-CATALYTIC-REDUCTION DEVICE

TECHNICAL FIELD

The present invention is drawn to a system and a method for selectively modifying the enablement conditions of a diagnostic for a selective-catalytic-reduction device to account for soot accumulation in a particulate filter.

BACKGROUND

A selective catalytic reduction (SCR) device is typically used as part of a vehicle exhaust system to reduce NOx gasses before the exhaust is discharged into the atmosphere. Diesel engines and, to a lesser extent, other internal combustion engines generate nitrogen oxide (NOx) gasses as byproducts of the fuel combustion process.

NOx gasses may be present in an exhaust stream in various forms, including as nitric oxide (NO), nitrogen dioxide ($NO_2$), and nitrous oxide ($N_2O$). Selective catalytic reduction (SCR) is a chemical process used for converting oxides of nitrogen ($NO_X$) with the aid of a catalyst into diatomic nitrogen ($N_2$) and water ($H_2O$).

In a vehicle equipped with an SCR device, a reductant, which may be an aqueous solution of urea, is typically injected into the engine's exhaust stream. Once in the exhaust stream the reductant is absorbed into the system's SCR catalyst, wherein the catalytic action of the SCR device ultimately converts NOx gasses into inert byproducts, i.e., nitrogen and water.

The exhaust stream is typically filtered with a particulate filter, in a diesel application a diesel particulate filter (DPF). The DPF, may be positioned upstream or downstream of the SCR device and captures engine soot and other suspended particulate matter before it can be discharged via the tailpipe. Overtime, soot loading accumulates in the porous media of the DPF. In-situ thermal regeneration of the DPF is therefore conducted periodically to burn off accumulated particulate matter.

A diagnostic for the SCR device is utilized to detect the overall NOx removal efficiency. Due to a high degree of confidence that is required in the levels of NOx gasses discharged by vehicles, certain government agencies require periodic monitoring of the NOx removal system efficiency to ensure the overall integrity of a diesel exhaust system, as well as to comply with government agency regulations.

The accuracy of the diagnostic for the SCR device is necessary to ensure correct reporting and maintenance of the diesel exhaust system in compliance with government agency requirements. It is also important to the consumer that the diagnostic produce only valid notifications indicating a failing emissions result.

SUMMARY

A vehicle is disclosed herein that includes an engine, an exhaust system, and a controller. The exhaust system includes a selective catalytic reduction (SCR) device configured to catalytically convert NOx gases present in the exhaust stream into water and nitrogen. The exhaust system may further include a particulate filter that removes particulate matter from the exhaust stream, and a delta pressure sensor that measures the differential pressure across the particulate filter. The vehicle further includes a controller in electrical communication with the delta pressure sensor and the SCR device.

The controller may include an efficiency diagnostic for determining the overall efficiency of the SCR device. The SCR efficiency diagnostic, via the controller, monitors the instantaneous and overall efficiency of the SCR device. The overall efficiency of the SCR device is generally compared to an efficiency threshold. If the overall operating efficiency of the SCR device is below the efficiency threshold the diagnostic will produce a failing emissions result.

However, some returned failing SCR efficiency diagnostic results can be generated in error due to the amount of contaminants that have flowed through the exhaust system since the last regeneration event of the particulate filter. Therefore, controller may determine based on variables such as measured differential pressure indicated by the delta pressure sensor, a time since a regeneration of the particulate filter detected by the controller, a distance traveled by the vehicle since a regeneration of the particulate filter detected by the controller, and an amount of fuel burned by the engine since the a regeneration event of the particulate filter detected by the controller, when to enable or disable the efficiency diagnostic of the SCR device to avoid erroneous failing monitoring results by executing a set of recorded instructions.

The present method may be utilized to alter the efficiency threshold of the SCR efficiency diagnostic due to contaminants and selectively enable or disable the SCR efficiency diagnostic as a function of an evaluation element, which accounts for the amount of contaminants that have flowed through the exhaust system since the last regeneration even of the particulate filter.

According to the method, the controller will select the evaluation element. The evaluation element is the maximum variable of one of a measured differential pressure indicated by the delta pressure sensor, a time since a regeneration of the particulate filter detected by the controller, a distance traveled by the vehicle since a regeneration of the particulate filter detected by the controller, and an amount of fuel burned by the engine since the a regeneration event of the particulate filter detected by the controller. The controller then selectively enables or disables the execution of the efficiency diagnostic of the SCR device as a function of the evaluation element.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 2 is a flow diagram describing an example method for monitoring operating efficiency of a selective catalytic reduction (SCR) device;

FIG. 3 is a flow diagram detailing an example method of selectively enabling or disabling the execution of an efficiency diagnostic of the SCR device as a function of an evaluation element;

FIG. 4 is a flow diagram detailing the first control action; and

FIG. 5 is a flow diagram detailing the second control action.

DETAILED DESCRIPTION

Figure 1:
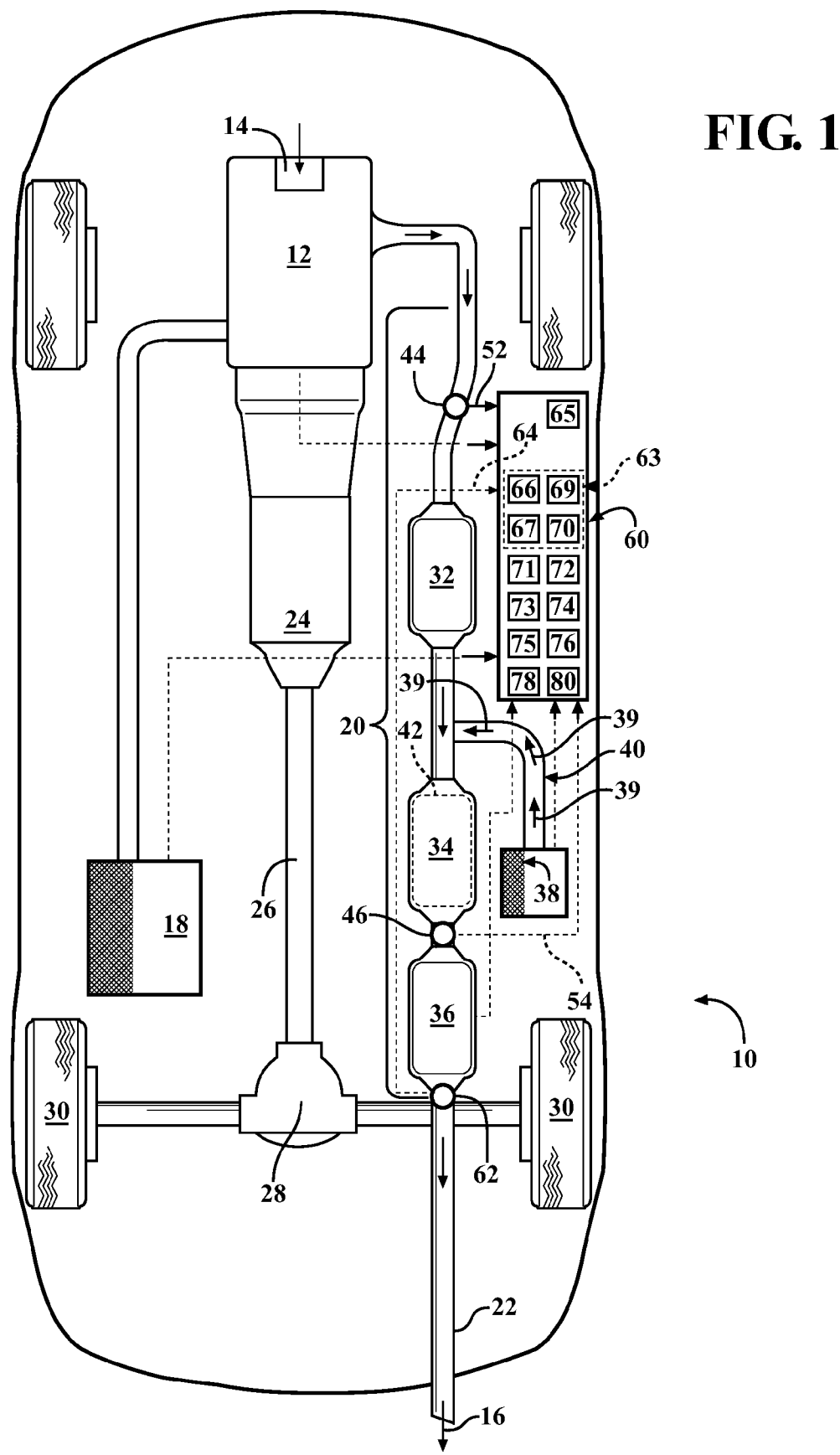
FIG. 1 is a schematic illustration of a vehicle with an engine connected to an exhaust system having a selective catalytic reduction (SCR) device.

Referring to the drawings, wherein like reference numerals refer to like components throughout the several views, FIG. 1 schematically depicts a motor vehicle 10. The vehicle 10 includes an internal combustion engine 12, e.g., a diesel engine or any other engine that emits significant levels of nitrogen oxide (NOx) gasses that has an air intake 14, which generates an exhaust stream 16. Energy released by combustion of the diesel fuel produces torque on a rotatable input member (not shown) of a transmission 24. Input torque from the engine 12 is transferred through the various gear sets, clutches, brakes, and interconnecting members (not shown) of the transmission 24 to a rotatable output member, such as a drive shaft 26. Output torque from the transmission 24 is thus delivered to a set of drive wheels 30, via the drive shaft 26 and a differential 18.

While a diesel application is described hereinafter for illustrative consistency, those of ordinary skill in the art will appreciate that a similar approach may be taken with respect to other engine designs.

As shown in FIG. 1, aboard the vehicle 10, combustion of diesel fuel drawn from a tank 18 generates the exhaust stream (arrow 16), which is then processed through the exhaust system 20 before being ultimately discharged from a tailpipe 22 into the surrounding atmosphere.

The vehicle 10 also includes a system 40 configured to assess overall operating efficiency of a selective-catalytic-reduction catalyst (SCR device) 34 that is employed for treating noxious emissions contained in an exhaust stream 16 of the engine 12. The exhaust stream 16 is emitted from the engine 12 as a by-product of combustion, and is removed to the ambient through the exhaust system 20. The exhaust system 20 includes a series of exhaust after-treatment devices, shown as a diesel oxidation catalyst 32, an SCR device 34, and a diesel particulate filter (DPF) 36.

Accordingly, the exhaust system 20 includes a passage for directing the exhaust gas stream 16 from the engine 12 through the series of exhaust after-treatment devices 32, 34, 36. Depending on the embodiment, the after-treatment devices 32, 34, 36 of the exhaust system 20 may be arranged in any desired order. Collectively, the oxidation catalyst 32, the SCR reduction catalyst 34, and the DPF 36 provide the necessary conditioning of the exhaust stream (arrow 16).

The shown series of exhaust after-treatment devices 32, 34, 36 is employed to reduce various exhaust emissions of the engine 12. In particular, the diesel oxidation catalyst 32 is adapted to receive exhaust gas stream 16 from the engine 12 to oxidize and burn hydrocarbon emissions present in the exhaust gas. The diesel oxidation catalyst 32 is in communication with a fuel injection device (not shown) that delivers a calibrated amount of fuel into the oxidation catalyst 32. Ignition of the injected fuel rapidly increases the temperature of the exhaust stream 16, typically 600° C. or more, in order to enable a thermal regeneration of the DPF 36.

Following the diesel oxidation catalyst 32, the exhaust gas stream 16 is routed to the SCR device 34. The SCR device 34 may be configured as a ceramic brick or a ceramic honeycomb structure, a plate structure, or any other suitable design. Selective catalytic reduction (SCR) is a means of converting oxides of nitrogen, also referred to as $NO_X$ with the aid of a catalyst into diatomic nitrogen, $N_2$, and water, $H_2O$. A gaseous reductant, typically anhydrous ammonia, aqueous ammonia or urea, is added to a stream of exhaust gas and is absorbed onto the SCR device 34 (shown at arrow 39). SCR is frequently employed to reduce $NO_X$ emissions in the exhaust of internal combustion engines used to power motor vehicles. Exhaust emissions of both gasoline and diesel engines may be improved by SCR. A general term "diesel-exhaust-fluid" or DEF 38 is used to describe a reductant that is employed by SCR in diesel engines. Accordingly, the DEF 38 accesses the SCR catalyst 34 as the exhaust gas stream 16 flows through SCR device 34.

An inner surface of the SCR device 34 may include a wash coat 42 for absorbing the reductant or DEF 38. The wash coat 42 serves to attract the DEF 38 in order to deposit the DEF 38 within the SCR device 34, such that the DEF 38 may interact with the exhaust gas stream 16 and generate a chemical reaction to reduce $NO_X$ emissions from the engine 12.

The SCR device 34 is characterized by operating efficiency that is determined by the effectiveness of the catalyst in reducing $NO_X$ emissions from the engine 12. The structural integrity of the wash coat 42 is a factor which contributes to the operating efficiency of the SCR catalyst 32. The wash coat 42 may become degraded as a result of thermal stress generated by the exhaust gas stream 16 such that the wash coat 42 becomes incapable of retaining the DEF 38 on the inner surface of the SCR device 34. Accordingly, when the wash coat 42 becomes degraded, the chemical reaction necessary to reduce $NO_X$ emissions from the engine 12 cannot be sustained and, as a result, the operating efficiency of the SCR device 34 also suffers.

After the exhaust gas stream 16 exits the SCR catalyst 34, but before it is allowed to pass to the atmosphere, the gas stream is routed through the diesel particulate filter (DPF) 36 wherein the sooty particulate matter emitted from the engine 12 is collected during a soot loading phase and disposed through the regeneration process. The efficiency of the SCR device 34 may also be degraded in correlation to the to the amount of soot accumulation on the particulate filter 36, during the soot loading phase leading up to the regeneration process.

The exhaust system 20 may further include at least one NOx sensor 44, 46. The at least one NOx sensor 44 may be positioned upstream with respect to the SCR device 34, such as at the outlet of the engine 12, i.e. an upstream NOx sensor 44 and/or positioned downstream with respect to the SCR device 34, for instance just before the DPF 36, i.e. a downstream NOx sensor 46. Structurally and functionally, the NOx sensors 44 and 46 may be otherwise identical. Each NOx sensor 44, 46 may return and feed NOx level measurements (arrows 52, 54) from the respective upstream and downstream NOx sensors 44, 46 into a controller 60.

Further, the exhaust system 20 may include a delta pressure sensor 62 that measures the differential pressure across the particulate filter 36. The delta pressure sensor 62 measures and calculates the pressure differential between the inlet and outlet sides of the DPF 36. The delta pressure sensor 62 may be a unitary sensor or gauge connected to the DPF 36, or it may be embodied as a pair of pressure taps that individually read inlet and outlet pressures and calculate the differential pressure across the DPF 36. The delta pressure sensor 62 may return resultant ΔP measurements (arrow 64) to the controller 60.

The controller 60 may be a stand-alone unit, or be part of an electronic controller that regulates the operation of the engine 12. The controller 60 may be embodied as a host machine or distributed system, e.g., a digital computer or microcomputer, acting as a vehicle control module, and/or as a proportional-integral-derivative (PID) controller device having a processor, and tangible, non-transitory memory such as read-only memory (ROM) or flash memory. The controller 60 may also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry.

The controller 60 of FIG. 1 is in electrical communication with the delta pressure sensor 62 and the SCR device 34. The controller 60 may also receive readings from each of the delta pressure sensor 62 and the upstream 44 and downstream 46 $NO_x$ sensors.

The controller may include an efficiency diagnostic 65 for determining the overall efficiency of the SCR device 34. The controller 60 may further include a processor and a tangible, non-transitory memory device on which is recorded instructions for selectively enabling or disabling execution of an efficiency diagnostic 65 of the SCR device 34. The SCR efficiency diagnostic 65, via the controller 60, monitors the instantaneous and overall efficiency of the SCR device 34. The overall efficiency of the SCR device 34 is generally compared to a first enablement threshold 72. If the overall operating efficiency of the SCR device 34 is below the first enablement threshold 72 the diagnostic will produce a failing emissions result.

However, some returned failing emissions results can be generated in error due to the amount of contaminants that have flowed through the exhaust system 20 since the last regeneration event of the particulate filter 36. Therefore, as the aim of the method 100 described herein, the controller 60 may alter the first enablement threshold 72 to account for soot accumulation in the DPF 36 when the end of a soot loading phase of the DPF 36 is approached (immediately preceding a regeneration cycle of the DPF 36) to a second enablement threshold 73, and subsequently selectively enabling or disabling the SCR efficiency diagnostic 65 based on a set of recorded instructions, improving the robustness of the SCR efficiency diagnostic 65 and preventing the production of an inaccurate failing emissions result.

The accuracy of the diagnostic 65 for the SCR device 34 is necessary to ensure correct reporting and maintenance of the diesel exhaust system 20 in compliance with government agency requirements. It is also important to the consumer that the monitoring produce only a valid warning or maintenance notifications.

As shown in FIG. 2, the method 100 of selectively enabling and disabling an efficiency diagnostic 65 of a selective catalytic reduction (SCR) device 34 may include two steps. At step 101, the controller 60 selects an evaluation element 63. The evaluation element 63 is the maximum variable of an instantaneous measured differential pressure 68, returned to the controller 60 by the delta pressure sensor 62 via signal 64; a time 67 since the last regeneration of the particulate filter 36; a distance traveled 69 by the vehicle 10 since the last regeneration of the particulate filter 36; and an amount of fuel burned 70 by the engine 12 since the last regeneration event of the particulate filter 36. Each of the instantaneous measured differential pressure 68, the time 67 since the last regeneration event of the particulate filter 36, the distance traveled 69 by the vehicle 10 since the last regeneration event of the particulate filter 36, and the amount of fuel burned 70 by the engine 12 since the last regeneration event of the particulate filter 36 are evaluated at the time the SCR efficiency diagnostic 65 attempts to perform and SCR efficiency check. The maximum of variable 67, 68, 69, 70 is then selected as the evaluation element 63 for the purposes of enabling or disabling the SCR efficiency diagnostic 65 for the purposes of the signaled SCR efficiency check. At step 102, the controller 60 selectively enables or disables the SCR efficiency diagnostic 65 of the SCR device 34, as a function of the evaluation element 63 (one of 66, 67, 69, 70) selected in step 101.

Step 102, wherein the controller selectively enables or disables the SCR efficiency diagnostic 65 of the SCR device 34, is further defined in FIG. 3. To selectively enable or disable the SCR efficiency diagnostic 65 of the SCR device 34 as a function of the evaluation element 63, the controller 60, at step 201 compares the evaluation element 63 (one of 66, 67, 69 and 70) to a first predetermined calibration value 71. At step 202, the controller 60 executes one of a first control action 203 and a second control action 204. The controller 60 executes the first control action 203, when the evaluation element 63 is less than the first predetermined calibration value 71. The controller 60 executes the second control action 204, when the evaluation element 63 is greater than the first predetermined calibration value 71.

The first control action 203 is further defined in FIG. 4. When executing the first control action 203 the controller 60, at step 301, weights, via first set of recorded instructions 76 on a tangible, non-transitory memory device of the controller 60, the first predetermined calibration value 71 by a first set of coefficients 74 to create a first enablement threshold 72. The first set of coefficients 74 may be a first plurality of weighted regression factors, each regression factor corresponding to a value of the evaluation element 63. In one configuration, the each regression factor may be a numeric value less than 1.0, and may scale the first predetermined calibration value 71 to account for each of soot accumulation on the DPF 36, time 67 since the last regeneration cycle, and distance traveled 69 since the last regeneration cycle. The first set of coefficients 74 may be arranged in a look-up table expressing the weighted regression value or correction factor as a function of the evaluation element 63. Lower evaluation element 63 values, generally produced at the beginning of the soot loading phase, generally correspond to higher weighted regression factors. Thus, the controller 60 weights the first predetermined calibration value 71 more heavily in instance where the evaluation element value 63 is lower, to produce a higher first enablement threshold 72. Higher evaluation element 63 values, generally produced at the end of the soot loading phase immediately preceding a regeneration cycle, generally correspond to lower weighted regression factors. Thus, the controller 60 weights the first predetermined calibration value 71 less heavily to produce a lower first enablement threshold 72

At step 302, the controller 60, enables the efficiency diagnostic 65 of the SCR device 34 based on the first enablement threshold 72 and allows the diagnostic 65 to evaluate the efficiency of the SCR device 34 and return a passing or failing emissions result.

The second control action 204 is further defined in FIG. 5. When executing the second control action 204 the controller 60, at step 401, weights, via a second set of recorded instructions 76 on a tangible, non-transitory memory device of the controller 60, the first predetermined calibration value 71 by a second set of coefficients 78 to create a second predetermined calibration value 80. The second set of coefficients 78 may be a second plurality of weighted regression factors, each regression factor corresponding to a value of the evaluation element 63. In one configuration, the each regression factor may be a numeric value less than 1.0, and may scale the first predetermined calibration value 71 to account for each of soot accumulation on the DPF 36, time 67 since the last regeneration cycle, and distance traveled 69 since the last regeneration cycle. The second set of coefficients 78 may be arranged in a look-up table expressing the weighted regression value or correction factor as a function of the evaluation element 63. Lower evaluation element 63 values generally correspond to higher weighted regression factors. Thus, the controller 60 weights the first predetermined calibration value 71 more heavily in instance where the evaluation element value 63 is lower, to produce a higher second predetermined calibration value 80. Higher evaluation element 63 values generally correspond to lower weighted regression factors. Thus, the controller 60 weights the first predetermined calibration value 71 less heavily to produce a lower second predetermined calibration value 80.

At step 402, the controller 60 compares the evaluation element 63 (one of 66, 67, 69, 70) to the second predetermined calibration value 80. At step 403, the controller 60 executes one of a third control action 404 and a fourth control action 407. The controller 60 executes the third control action 404 when the evaluation element 63 is less than the second predetermined calibration value 80. The controller 60 executes the fourth control action 407 when the evaluation element 63 is greater than the second predetermined calibration value 80.

In executing the third control action 404, the controller 60, via the first set of recorded instructions 76, at step 405, weights the second predetermined calibration value 80 by the first set of coefficients 74, as described herein above, to create a second enablement threshold 73. At step 406, the controller 60, enables the efficiency diagnostic 65 of the SCR device 34 based on the second enablement threshold 73.

In executing the fourth control action 407, the controller 60, at step 408, disables the efficiency diagnostic 65 of the SCR device 34 based on the second enablement threshold 73, in order to avoid allowing the SCR efficiency diagnostic 65 from running at times when the proficiency of the diagnostic 65 may be poor due to contaminants collected on the DPF 36 during the soot loading phase. At time of poor diagnostic proficiency, the efficiency diagnostic 65 for the SCR device 34 may produce failing emissions results that can be generated in error due to the amount of contaminants that have flowed through the exhaust system 20 since the last regeneration even of the particulate filter 36, i.e. a high evaluation element value 63.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
an engine that generates an exhaust stream;
an exhaust system in fluid communication with the engine, wherein the exhaust system includes:
a selective catalytic reduction (SCR) device configured to catalytically convert nitrogen oxide (NOx) gases present in the exhaust stream into water and nitrogen;
a particulate filter configured to remove particulate matter from the exhaust stream;
a delta pressure sensor that is configured to measure the differential pressure across the particulate filter;
a controller in electrical communication with the delta pressure sensor and the SCR device, the controller including a processor and a tangible, non-transitory memory device on which is recorded instructions for selectively enabling an efficiency diagnostic of the SCR device, wherein executing the recorded instructions causes the processor to:
receive a measured differential pressure from the delta pressure sensor;
select an evaluation element, wherein the evaluation element is the maximum variable of one of the measured differential pressure received from the delta pressure sensor, a time since a regeneration of the particulate filter detected by the controller, a distance traveled by the vehicle since a regeneration of the particulate filter detected by the controller, and an amount of fuel burned by the engine since the a regeneration event of the particulate filter detected by the controller; and
selectively enable the efficiency diagnostic of the SCR device as a function of the evaluation element, such that selectively enabling the efficiency diagnostic of the SCR device as a function of the evaluation element includes:
comparing the evaluation element to a first predetermined calibration value; and
executing a first control action when the evaluation element is less than the first predetermined calibration value and executing a second control action when the evaluation element is greater than the first predetermined calibration value;
wherein executing the first control action includes:
weighting, via a first set of recorded instructions stored on the tangible, non-transitory memory device of the controller, the first predetermined calibration value by a first set of coefficients to create a first enablement threshold; and
enabling the efficiency diagnostic of the SCR device based on the first enablement threshold; and
wherein executing the second control action includes:
weighting, via a second set of recorded instructions stored on the tangible, non-transitory memory device of the controller, the first predetermined calibration value by a second set of coefficients to create a second predetermined calibration value;
comparing the evaluation element to a second predetermined calibration value; and
executing a third control action when the evaluation element is less than the second predetermined calibration value and executing a fourth control action when the evaluation element is greater than the second predetermined calibration value.

2. The vehicle of claim 1 wherein the engine is a diesel engine.

3. The vehicle of claim 1 wherein executing the third control action includes:
weighting, via the first set of recorded instructions, the second predetermined calibration value by the first set of coefficients to create a second enablement threshold; and
enabling the efficiency diagnostic of the SCR device based on the second enablement threshold.

4. The vehicle of claim 1 wherein executing the fourth control action includes disabling the efficiency diagnostic of the SCR device based on the second enablement threshold.

5. The vehicle of claim 1 wherein the first set of coefficients comprises a first plurality of weighted regression factors, each regression factor corresponding to a value of the evaluation element, wherein the controller assigns a higher regression factor to the first predetermined calibration value near the end of a soot loading phase of the particulate filter.

6. The vehicle of claim 1 wherein the second set of coefficients comprises a second plurality of weighted regression factors, each regression factor corresponding to a value of the evaluation element, wherein the controller assigns a higher regression factor to the first predetermined calibration value near the end of a soot loading phase of the particulate filter.

7. A method of selectively enabling and disabling an efficiency diagnostic of a selective-catalytic-reduction device, the method comprising:
   providing a vehicle having:
      an engine that generates an exhaust stream;
      an exhaust system in fluid communication with the engine, wherein the exhaust system includes:
         a selective catalytic reduction (SCR) device configured to catalytically convert nitrogen oxide (NOx) gases present in the exhaust stream into water and nitrogen;
         a particulate filter configured to remove particulate matter from the exhaust stream;
         a delta pressure sensor configured to measure the differential pressure across the particulate filter; and
      a controller in electrical communication with the delta pressure sensor and the SCR device, the controller including a processor and a tangible, non-transitory memory device on which is recorded instructions for selectively enabling an efficiency diagnostic of the SCR device;
   receiving, via the controller, a measured differential pressure from the delta pressure sensor;
   selecting, via the controller, an evaluation element, wherein the evaluation element is the maximum variable of one of the measured differential pressure received from the delta pressure sensor, a time since a regeneration of the particulate filter, a distance traveled by the vehicle since a regeneration of the particulate filter, and an amount of fuel burned by the engine since the a regeneration event of the particulate filter; and
   selectively enabling or disabling the execution of the efficiency diagnostic of the SCR device as a function of the evaluation element, such that selectively enabling the efficiency diagnostic of the SCR device as a function of the evaluation element includes:
      comparing the evaluation element to a first predetermined calibration value; and
      executing a first control action when the evaluation element is less than the first predetermined calibration value and executing a second control action when the evaluation element is greater than the first predetermined calibration value;
      wherein executing the first control action includes:
         weighting, via a first set of recorded instructions stored on the tangible, non-transitory memory device of the controller, the first predetermined calibration value by a first set of coefficients to create a first enablement threshold; and
         enabling the efficiency diagnostic of the SCR device based on the first enablement threshold; and
      wherein executing the second control action includes:
         weighting, via a second set of recorded instructions stored on the tangible, non-transitory memory device of the controller, the first predetermined calibration value by a second set of coefficients to create a second predetermined calibration value;
         comparing the evaluation element to a second predetermined calibration value; and
         executing a third control action when the evaluation element is less than the second predetermined calibration value and executing a fourth control action when the evaluation element is greater than the second predetermined calibration value.

8. The method of claim 7 wherein the measured differential pressure is the instantaneous differential pressure measured across the particulate filter, and wherein the engine is a diesel engine.

9. The method of claim 7 wherein the third control action includes:
   weighting, via the first set of recorded instructions on the tangible, non-transitory memory device of the controller, the second predetermined calibration value by the first set of coefficients to create a second enablement threshold; and
   enabling the efficiency diagnostic of the SCR device based on the second enablement threshold.

10. The method of claim 7 wherein the fourth control action includes disabling the efficiency diagnostic of the SCR device based on the second enablement threshold.

* * * * *